(12) United States Patent
Beckley et al.

(10) Patent No.: US 6,451,951 B2
(45) Date of Patent: Sep. 17, 2002

(54) SEMI-TELECHELIC NITROGEN-FUNCTIONAL OLIGOMER

(75) Inventors: Ronald Scott Beckley, Gilbertsville, PA (US); Barry Clifford Lange, Lansdale, PA (US); David William Whitman, Sumenytown, PA (US); Jo Ann Arceneaux, Marietta, GA (US); Michael Christopher Kramer, Acworth, GA (US); Peter Thomas Weissman, Woodstock, GA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/886,182

(22) Filed: Jun. 21, 2001

Related U.S. Application Data

(60) Provisional application No. 60/215,721, filed on Jul. 3, 2000.

(51) Int. Cl.$^7$ ............................................. C08F 220/10
(52) U.S. Cl. .................... 526/328.5; 526/258; 526/260; 526/266; 526/303.1; 526/317.1; 526/318.4; 526/320; 526/321
(58) Field of Search ................. 526/258, 260, 526/266, 303.1, 317.1, 318.4, 320, 321, 328.5

(56) References Cited

U.S. PATENT DOCUMENTS

| | | |
|---|---|---|
| 3,914,165 A | 10/1975 | Gaske |
| 4,120,839 A * | 10/1978 | Emmons et al. ........... 260/29.2 |
| 4,158,736 A | 6/1979 | Lewis et al. |
| 5,324,879 A | 6/1994 | Hawthorne |
| 5,362,826 A | 11/1994 | Berge et al. |
| 5,441,775 A | 8/1995 | Beck et al. |
| 5,710,227 A | 1/1998 | Freeman et al. |

FOREIGN PATENT DOCUMENTS

| | | |
|---|---|---|
| DE | 44 05 041 A1 | 8/1995 |
| EP | 0 358 358 A2 | 3/1990 |
| EP | 0 879 860 A | 11/1998 |
| FR | 2 377 421 | 8/1978 |

OTHER PUBLICATIONS

"Chemistry & Technology of UV & EB Formulation for Coatings, Inks & Paints", Prepolymers & Reactive Diluents, vol. 11, Edited by G. Webster, pp. 168–173.

"A New Synthesis of 4–Aminoquinolines", Journal of the American Chemical Society, vol. 71, (1949), W. S. Johnson, E. L. Woroch, & B. G. Buell, pp. 1901–1903.

"The Chemistry of Methyl Vinyl Ketone. 11", Journal of Organic Chemistry, vol. 29, pp. 2346–2950 (1964), N. C. Ross & R. Levine.

* cited by examiner

*Primary Examiner*—Helen L. Pezzuto
(74) *Attorney, Agent, or Firm*—Gary D. Greenblatt; Gregory M. Hill

(57) ABSTRACT

The present invention relates to an oligomer with a semi-telechelic nitrogen-functionality and at least one ethylenic unsaturation pendant to the backbone of the oligomer. In addition, a process is provided to prepare the semi-telechelic nitrogen-functional oligomer. The semi-telechelic nitrogen-functional oligomer is useful as a dispersant for pigments in radiation curable formulations.

7 Claims, No Drawings

SEMI-TELECHELIC NITROGEN-FUNCTIONAL OLIGOMER

CROSS REFERENCE TO RELATED PATENT APPLICATIONS

This is a non-provisional application of prior pending U.S. provisional application Ser. No. 60/215,721 filed Jul. 3, 2000.

The present invention relates to an oligomer including a nitrogen functionality and at least one ethylenic unsaturation. In particular, this oligomer has a nitrogen-functionality at one end of the oligomer, referred to herein as a semi-telechelic nitrogen-functionality, and at least one ethylenic unsaturation pendant to the oligomer backbone. Further, this invention relates to methods of preparing the oligomer.

U.S. Pat. No. 3,914,165 to Gaske discloses radiation curable amine containing monomers based on multifunctional acrylates which are partially functionalized with diethyl amine. Gaske discloses that these monomers are useful as amine synergists which are oxygen scavengers used to overcome the inhibiting effects of oxygen on the cure rate of radiation curable materials. Gaske exemplifies the use of these monomers in coatings such as pigmented inks and showed that formulations containing these monomers readily cured in the presence of oxygen. In "Chemistry & Technology of UV & EB Formulation for Coatings, Inks & Paints", Volume II, edited by G. Webster, John Wiley & Sons, Ltd., New York, N.Y., it is also disclosed that amine acrylates such as the monomers of Gaske may promote pigment wetting. However, one deficiency with the nitrogen-functional monomers of Gaske is that in the process to prepare these monomers, the addition of the amines to the multifunctional acrylates is a random process which leads to a mixture of monomers including monomers with more than one amine functionality and monomers without an amine functionality.

In the present invention, a new class of nitrogen-functional, ethylenically unsaturated oligomers is provided which are useful as polymerizable dispersants and for radiation curable formulations. In particular, the oligomers of this invention have a single nitrogen-functionality located at one end of the oligomer chain. The semi-telechelic nitrogen-functionality is believed to allow the nitrogen-functionality to absorb onto the pigment surface without steric hindrance with the pendant polymerizable groups. Further, the oligomer chain containing the pendant ethylenic unsaturations may project away from the pigment surface into the hydrophobic monomers of the medium. These ethylenic unsaturations pendant to the oligomer backbone are unencumbered by the nitrogen-functionality and may readily react with the other monomers in the medium. Further, the method of preparing the semi-telechelic nitrogen-functional oligomers yields oligomers with a single nitrogen-functionality on each oligomer chain.

The first aspect of this invention provides a semi-telechelic nitrogen-functional oligomer with formula:

$$R_1R_2N\text{---}(CH_2)_m\text{---}(NH)_n\text{---}A$$

where A is the residue of a macromonomer bearing at least one pendant ethylenic unsaturation and where A has a degree of polymerization in the range of 2 to 50, where n is 0 or 1, where m is 0 when n is 0, where m is an integer in the range of 0 to 18 when n is 1, and where $R_1$ and $R_2$ are groups independently selected from the group consisting of H, $C_1$ to $C_{12}$ branched, unbranched, and cyclic alkyl; phenyl; and substituted phenyl subject to the limitation that only $R_1$ or $R_2$ is H; or where $R_1R_2N$— is a cyclic group.

The second aspect of this invention provides a method of preparing a semi-telechelic nitrogen-functional oligomer with formula:

$$R_1R_2N\text{---}(CH_2)_m\text{---}(NH)_n\text{---}A$$

where A is the residue of an macromonomer bearing at least one pendant ethylenic unsaturation and has a degree of polymerization in the range of 2 to 50, where n is 0 or 1, where m is 0 when n is 0, where m is an integer in the range of 0 to 18 when n is 1, and where $R_1$ and $R_2$ are groups independently selected from the group consisting of H, $C_1$ to $C_{12}$ branched, unbranched, and cyclic alkyl; phenyl; and substituted phenyl subject to the limitation that only $R_1$ or $R_2$ is H, or where $R_1R_2N$— is a cyclic group; including the steps of preparing a terminally unsaturated precursor macromonomer bearing pendant functional groups, reacting an amine with the terminal unsaturation of the terminally unsaturated precursor macromonomer, and reacting modifiers comprising ethylenic unsaturation with the pendant functional groups.

As used herein, the term "(meth)acrylate" denotes both "acrylate" and "methacrylate", the term "(meth)acrylic" denotes both "acrylic" and "methacrylic", and the term "(meth)acrylamide" denotes both "acrylamide" and "methacrylamide".

As used herein, the term "pendant" means that a group, a functional group, or a reactive moiety, is not in the backbone structure of a macromonomer or an oligomer. Further, the reaction of a pendant group for the present invention will not cause any changes of the backbone structure of the macromonomer or oligomer.

The semi-telechelic nitrogen-functional oligomer of this invention is an oligomer with at least one ethylenic unsaturation pendant to the oligomer backbone and with one end of the oligomer terminated by a nitrogen containing group. The ethylenic unsaturation pendant to the oligomer provides a means to incorporate the oligomer into a polymer matrix. The nitrogen functionality provides a functional group which may bond or associate with the surface of a pigment and aid in the dispersion of a pigment. The oligomer of this invention may be represented by formula (I):

$$R_1R_2N\text{---}(CH_2)_m\text{---}(NH)_n\text{---}A. \tag{I}$$

in which A is the residue of a macromonomer with at least one pendant ethylenic unsaturation and the component $R_1R_2N$—$(CH_2)_m$—$(NH)_n$ represents the nitrogen functionality.

The semi-telechelic nitrogen-functional oligomer may be prepared by a general scheme which is summarized below. This general scheme is used to illustrate the invention only. It is not intended to limit the scope of the invention which is defined herein by the specification and the claims. It is also contemplated that some of the steps may be carried out simultaneously or sequentially.

1) Preparation of a terminally unsaturated precursor macromonomer which includes functional groups.
2) Addition of nitrogen functionality to the terminal unsaturation of the precursor macromonomer.
3) Reaction of the functional groups with modifiers including ethylenic unsaturation.

The semi-telechelic nitrogen-functional oligomer may be prepared by first preparing a terminally unsaturated precursor macromonomer, referred to herein as "precursor macromonomer". The precursor macromonomer includes as polymerized groups the residues of at least one first monomer and at least one second monomer which includes a functional group. The precursor macromonomer is characterized as having an ethylenic unsaturation at one end. The terminal unsaturation may be connected directly to an end monomer residue or may be connected to a linker group, as described herein in formulas (IV) and (V), which is connected to an end monomer residue. In one embodiment, the precursor macromonomer may be represented by the formula (II):

$$Q-[Y]_y[T]_z-H \qquad (II)$$

in which Y is the residue of at least one first monomer and T is the residue of at least one second monomer. The individual residues Y and T may be arranged to form alternating, random, or block structures in the precursor macromonomer. The group Q is the terminal unsaturation and optionally, includes a linker group.

The first monomer is an ethylenically unsaturated monomer and may be selected from the group consisting of olefins, styrenes, substituted styrenes, vinyl esters, vinyl ethers, (meth)acrylic acid, alkyl esters of (meth)acrylic acid, hydroxyalkyl esters of (meth)acrylic acid, (meth) acrylamide, N-substituted (meth)acrylamides, methyl vinyl ketone, and mixtures thereof. Preferred monomers include monomers with an α,β-unsaturated carbonyl group such as alkyl esters of (meth)acrylic acid.

Examples of functional groups include halide, hydroxy, hydroxyalkyl, hydroxyaryl, esters of carboxylic acids, aldehyde, ketone, alkylsiloxy, alkoxysilyl, arylsiloxy groups. Suitable second monomers include allyl alcohol, allyl esters such as allyl acetate, vinyl chloride, vinyl bromide, vinyl acetate, vinyl benzoate, $C_1$–$C_{18}$ alkyl esters of (meth)acrylic acid, 2-hydroxyethyl (meth)acrylate, 3-hydroxypropyl (meth)acrylate, 4-hydroxybutyl (meth) acrylate, acrolein, methacrolein, vinyltrimethoxysilane, vinyltriethoxysilane, vinyltrichlorosilane, allyltrichlorosilane, allyltrimethoxysilane, allyltriethoxysilane, allyltrichlorosilane, γ-methacryloxypropyltrimethoxysilane, allyltriethoxysilane, allyltrimethoxysilane, and mixtures thereof. Preferred second monomers include methyl methacrylate, hydroxyethyl methacrylate, hydroxyethyl acrylate, and isobornyl (meth)acrylate.

Alternately, the functional group may be generated from a "second monomer equivalent" after the polymerization reaction which prepares the precursor macromonomer. The second monomer equivalent is a monomer which has a group that may be converted to produce the desired functional group after the polymerization reaction is complete or substantially completed during the polymerization reaction. This requires the use of a second monomer equivalent in the polymerization and at least one additional conversion reaction to generate the desired functional group. An example of a second monomer equivalent is vinyl alcohol which does not have a chemically stable monomeric form for use in polymerization reactions. Vinyl acetate may be used as the equivalent monomer for vinyl alcohol. After the polymerization of the vinyl acetate with the first monomer, the precursor macromonomer is subjected to hydrolysis of the acetate group to generate the desired hydroxyl group. Further, the second monomer equivalent may be the same as the first monomer used in the polymerization reaction. For example, vinyl acetate may be used as both the first monomer and the second monomer equivalent to prepare a precursor macromonomer. Partial hydrolysis of the vinyl acetate residues yields a precursor macromonomer with residues of vinyl acetate and vinyl alcohol.

The average compositional range of the precursor macromonomer can vary depending on the choice of first monomer and second monomer, and the desired properties of the semi-telechelic nitrogen-functional oligomer prepared from the precursor macromonomer. A preferred composition range of first monomer to second monomer is 10:1 to 1:10, and a more preferred range is 4:1 to 1:4. The degree of polymerization of the precursor macromonomer is the average number of monomer residues in the precursor macromonomer and is equal to the sum of (y+z) in Formula II. The degree of polymerization may be in the range from 2 to 50, preferably from 3 to 25, and more preferably from 5 to 15. The polydispersity of a mixture of precursor macromonomers may vary over a wide range and may include bimodal or multimodal distributions. A preferred polydispersity is in the range of 1 to 5, preferably in the range of 1 to 3, and more preferably in the range of 1.5 to 3.

The composition and degree of polymerization of the precursor macromonomers can be determined by many conventional analytical techniques such as infrared spectroscopy, gel permeation chromatography (GPC), and NMR. The mole ratio of the monomer residues in the precursor macromonomers can be determined by proton NMR or by gas chromatography of the residual monomers in the unpurified precursor macromonomer sample. The number average molecular weight ($M_n$) and the weight average molecular weight ($M_w$) are determined by gel permeation chromatography (GPC) using poly methyl methacrylate molecular weight standards. The average oligomer formula and the degree of polymerization is calculated from the $M_n$ and the mole ratio of monomer residues in the precursor macromonomer. The polydispersity of the precursor macromonomer is the ratio of $M_w$ to $M_n$.

The precursor macromonomer may be prepared by various polymerization processes known in the art. Anionic polymerization as disclosed in U.S. Pat. No. 4,158,736 and high temperature radical polymerization as disclosed in U.S. Pat. No. 5,710,227 provides a precursor macromonomer represented by formula (III):

$$H_2C=C(R')-[Y]_y[T]_z-H \qquad (III)$$

in which R' represents the pendant group of either the first monomer or the second monomer. For example, for a precursor macromonomer prepared from butyl acrylate as the first monomer and 2-hydroxyethyl acrylate as the second monomer, the R' group is either the butyl ester of carboxylic acid or the 2-hydroxyethyl ester of carboxylic acid.

The precursor macromonomer may also be prepared by catalytic chain transfer polymerization with terminally unsaturated macromonomers used as chain transfer agents as described in U.S. Pat. No. 5,362,826. Alternatively, the transition metal complexes may be used to prepare the precursor macromonomer as disclosed in U.S. Pat. No. 5,324,879. The precursor macromonomers prepared by these processes may be represented by formula (IV):

$$H_2C=C(R')-CH_2-[Y]_y[T]_z-H \qquad (IV)$$

in which R' represents the pendant group of either the first monomer or the second monomer. In this process, it is preferred that at least one of the monomers used in the preparation of the precursor monomer is an ester of methacrylic acid.

Another process to prepare the precursor macromonomer is conventional radical polymerization using a hydroxyfunctional chain transfer agent such as 2-mercaptoethanol. Next a terminal unsaturation is attached by reacting an ethylenically unsaturated monomer with a complementary reactive group which is reactive with the hydroxyl group of the chain transfer agent. Examples of ethylenically unsaturated monomers with a complementary reactive group include glycidyl (meth)acrylate, isocyanatoethyl (meth)acrylate, and (meth)acrylic acid. The ethylenically unsaturated monomers with a complementary reactive group may be attached to the fragment of the hydroxy-functional chain transfer agent by various linkages including ester, urethane, amide, amine, or ether linkages. The precursor macromonomer prepared by this method may be represented by formula (V):

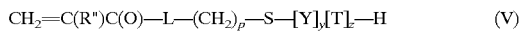

$$CH_2=C(R'')C(O)-L-(CH_2)_p-S-[Y]_x[T]_z-H \qquad (V)$$

in which R" represents a H or $CH_3$ group, —C(O)—L represents linker groups such as ester, urethane, amide, and ether linkages, and p is an integer in the range of 1 to 20. During the reaction of the hydroxyl group of the chain transfer agent with an ethylenically unsaturated monomer with a complementary reactive group, the residual groups T and Y may not contain hydroxyl groups as these may provide alternate reaction sites for the ethylenically unsaturated monomer with a complementary reactive group. It is preferred that the residual groups T and Y contain pendant groups which are nonreactive to the ethylenically unsaturated monomer with a complementary reactive group.

The precursor macromonomers may be prepared by bulk polymerization, solution polymerization, and emulsion polymerization using batch, semicontinuous, or continuous processes. Preferred methods of preparing the precursor macromonomers are high temperature radical polymerization using a semicontinuous or continuous process, catalytic chain transfer polymerization, and conventional radical polymerization using a hydroxy-functional chain transfer agents.

The precursor macromonomers may be isolated and purified by methods known in the art such as vacuum distillation, rotary evaporation or wiped film distillation to remove solvent and impurities such as residual monomers.

The next step in the preparation of the semi-telechelic nitrogen-functional oligomers of this invention is the introduction of the nitrogen functionality onto one end of the precursor macromonomer to prepare an nitrogen-functional macromonomer. In particular, an amine is reacted with the terminal unsaturation of the precursor macromonomer by various synthetic methods known in the art. A preferred method is conjugate addition of an amine to an activated carbon-carbon bond. Various amines may be used including primary and secondary amines, hydrazines, and diamines. The choice of amine may be determined by the reactivity of the amine towards the terminal unsaturation of the precursor macromonomer and the use of the semi-telechelic nitrogen-functional oligomer in a particular application. For example, primary amines are more reactive towards the terminal unsaturation of the precursor macromonomer than secondary amines.

For the use of the semi-telechelic nitrogen-functional oligomer in the application of dispersing pigments, amines such as tertiary amines with $C_1$ to $C_4$ alkyl groups are effective.

Amines suitable for reaction with the terminal unsaturation include primary amines such as $C_1$ to $C_{12}$ branched and unbranched alkyl amines, and secondary amines such as dimethylamine. Preferred primary amines include methylamine, n-butylamine, and ethylamine. Other suitable amines include hydrazines such as N,N-dimethyl hydrazine. Further suitable amines include amines of formula (VI):

$$R_1R_2N-(CH_2)_m-NH_2 \qquad (VI)$$

such as diamines in which $R_1$ and $R_2$ are groups independently selected from the group consisting of H, $C_1$ to $C_{12}$ branched, unbranched, and cyclic alkyl; phenyl; and substituted phenyl groups and m is an integer with a value in the range of 1 to 18. The diamines of formula (VI) are further limited by the restriction that $R_1$ and $R_2$ are not simultaneously H. Still other suitable amines include nitrogen ring compounds in which the substituent groups $R_1$ and R2 are part of a cyclic group including at least one nitrogen atom. Suitable amines containing a nitrogen ring compound include 4-(2-aminoethyl)morpholine, 1-(2-aminoethyl)piperazine, 4-aminomorpholine, 1-(2-aminoethyl)piperidine, 2-(2-aminoethyl)pyridine, 1-(2-aminoethyl)pyrrolidine, 2-(aminomethyl)pyridine, 3-(aminomethyl)pyridine, 4-(aminomethyl)pyridine, 1-(3-aminopropyl)imidazole, 4-(3-aminopropyl)morpholine, and 1-(3-aminopropyl)-2-pipecoline. Examples of preferred amines include N,N-dimethyl 1,3-propanediamine, N,N-dimethylethylenediamine, 1-(2-aminoethyl)piperidine, 1-(2-aminoethyl)pyrrolidine, 1-(3-aminopropyl)imidazole, and 4-(3-aminopropyl)morpholine.

A preferred synthetic process to attach the amine onto the terminal unsaturation of the precursor macromonomer is conjugate addition of an amine to an activated carbon-carbon bond such as an α,β-unsaturated carbonyl group. Suitable conditions for this reaction are well known in the art and generally involve heating a mixture containing the amine and the precursor macromonomer and monitoring the progress of the reaction using a suitable analytical technique such as NMR. Suitable reaction conditions are described in W. S. Johnson, E. L. Woroch, and B. G. Buell, Journal of the American Chemical Society, Vol. 71, 1949, pp. 1901–1903 and N. C. Ross and R. Levine, Journal of Organic Chemistry, Vol. 29, 1964, pp 2346–2350.

The semi-telechelic nitrogen-functional oligomer may be prepared from the nitrogen-functional macromonomer by attaching at least one modifier containing an ethylenically unsaturated group onto a functional group of a second monomer residue, thus forming a residue of a monomer bearing a pendant ethylenic unsaturation. The modifier which contains an ethylenically unsaturated group has a complementary functional group which is reactive towards the functional group of the second monomer residue. Suitable modifiers include monomers with complementary functional groups such as (meth)acrylates.

The choice of suitable complementary functional groups to react with the functional group of the second monomer residue are well known in the art. The following reactions between the modifier and the functional group of the second monomer residue are within the scope of the invention whether the functional groups are present on the second monomer prior to the preparation of the precursor macromonomer or generated after the preparation of the precursor macromonomer. Further, the functional groups may be generated after the attachment of the nitrogen functionality.

I. When the functional group is a hydroxy (—OH) group, the complementary functional groups of the modifier may be selected from ethylenically unsaturated carboxylic acids, esters of the ethylenically unsaturated carboxylic acids, acyl halide derivatives of the ethylenically unsaturated carboxylic acids, and mixtures thereof. Examples of a second monomer in this group include allyl alcohol, 2-hydroxyethyl (meth)acrylate, 2-hydroxyethyl crotonate, 3-hydroxypropyl (meth)acrylate, 3-hydroxypropyl crotonate, 4-hydroxybutyl (meth)acrylate, and mixtures thereof. Examples of a second monomer equivalent include allyl acetate, allyl propionate, and vinyl acetate. Examples of a suitable modifier include (meth)acrylic acid, crotonic acid, maleic acid, fumaric acid, itaconic acid, methacrylic anhydride, citraconic acid, cinnamic acid, methylcinnamic acid, methyl (meth)acrylate, methyl crotonate, ethyl (meth)acrylate, ethyl crotonate, n-propyl (meth)acrylate, n-propyl crotonate, i-propyl (meth) acrylate, i-propyl crotonate, n-butyl (meth)acrylate, n-butyl crotonate, 2-ethylhexyl (meth)acrylate, 2-ethylhexyl crotonate, and mixtures thereof, and acryloyl chloride, methacryloyl chloride, crotonyl chloride, and mixtures thereof.

II. When the functional group is an alkoxysilyl group, the complementary functional groups of the modifier may be selected from hydroxyalkyl esters of ethylenically unsaturated carboxylic acids and mixtures thereof. Examples of a second monomer in this group include vinyltriethoxysilane, vinyltrimethoxysilane, y-methacryloxypropyltrimethoxysilane, vinyltrichlorosilane, allyltriethoxysilane, allyltrichlorosilane, and mixtures thereof. Examples of a suitable modifier include 2-hydroxyethyl (meth)acrylate, 2-hydroxyethyl crotonate, 3-hydroxypropyl (meth) acrylate, 3-hydroxypropyl crotonate, 4-hydroxybutyl (meth)acrylate, 4-hydroxybutyl crotonate, and mixtures thereof.

III. When the functional group is an aldehyde or a ketone, the complementary functional group of the modifier may be a hydroxyalkyl group. Examples of a second monomer are acrolein, methacrolein, methyl vinyl ketone, and mixtures thereof. Examples of a suitable modifier include 2-hydroxyethyl (meth)acrylate, 2-hydroxyethyl crotonate, 3-hydroxypropyl (meth)acrylate, 3-hydroxypropyl crotonate, 4-hydroxybutyl (meth)acrylate, 4-hydroxybutyl crotonate, and mixtures thereof.

The semi-telechelic nitrogen-functional oligomer of this invention may be a liquid or a solid. A preferred form is a liquid with a viscosity less than 10 Pa-s at 25° C. to provide easy handling, pouring, and formulation with other materials. A more preferred form is a liquid with a viscosity less than 1 Pa-s at 25° C. Alternately, the semi-telechelic nitrogen-functional oligomer may be provided in a solvent medium including haloalkanes such as chloroform; ethers such as ethyl ether; esters such as ethyl acetate; alcohols such as isopropanol and n-butanol; alkanes such as hexane and cyclopentane; ketones such as acetone, amides such as N-methylpyrrolidone; nitriles such as acetonitrile; and aromatics such as toluene.

Other ingredients may be added to the semi-telechelic nitrogen-function oligomer of this invention including polymerization inhibitors such as hydroquinone and p-methoxyphenol; wetting agents; defoamers; antioxidants; and biocides such as fungicides and bactericides. Further, other dispersants may be added to the semi-telechelic nitrogen-functional oligomer to provide dispersant mixtures more effective to disperse specific pigments or mixtures of pigments. In one embodiment, the semi-telechelic nitrogen function oligomer is provided as a dispersion in a medium, preferably a medium containing water, more preferably an organic solvent-free aqueous dispersion. Optionally, surfactants may be used to aid in the preparation of the dispersion and to provide stability to the dispersion.

The semi-telechelic nitrogen-functional oligomer is useful as a dispersant for pigments, particularly in curable formulations such as radiation curable inks and coatings. The pigments may be dispersed by methods well known in the art such as methods described in chapters 17–24 of "Paint Flow and Pigment Dispersion" by T. C. Patton, John Wiley Sons, New York, N.Y. (1979). The semi-telechelic nitrogen-functional oligomer may be added to the ink formulation prior to, during, or after the addition of the pigment. Suitable pigments include inorganic pigments such as titanium dioxide, zinc oxide, zinc sulfide, lithopone, lead oxides, iron oxide, bismuth vanadate, chromium(III) pigments, lead chromate, carbon black, and metal pigments; and organic pigments such as pigments listed in Table 1 on pages 42–45 of the "Kirk-Othmer Encyclopedia of Chemical Technology", Volume 19, $4^{th}$ Edition (1996).

In radiation curable formulations, semi-telechelic nitrogen-functional oligomers containing N-methyl amines and N,N-dimethyl amines are also useful as amine synergists when used in combination with hydrogen abstracting photoinitiators by providing a source of abstractable hydrogen atoms.

As used herein, curable formulations refer to formulations which contain ethylenically unsaturated materials such as monomers and oligomers. In the presence of a suitable initiator, the ethylenically unsaturated materials may undergo reaction to produce a polymer matrix. One example is a radiation curable formulation which contains ethylenically unsaturated monomers such as isobornyl acrylate, trimethylolpropane triacrylate, ethylene glycol diacrylate, and pentaerythritol triacrylate, and a photoinitiator such a benzophenone. Exposure to electromagnetic radiation such a ultraviolet or visible radiation, or electron beam irradiation initiates the reaction of the monomers leading to a polymer matrix. In another embodiment, a curable formulation which contains ethylenically unsaturated monomers and is cured by free radicals generated by chemical or thermal processes is provided.

The semi-telechelic nitrogen-functional oligomer may also be used as a monomer in polymerizations such as emulsion polymerization or as a polymerizable emulsifier. In aqueous emulsion polymerization, the semi-telechelic nitrogen-functional oligomer may provide stability to the emulsion polymer particles. Semi-telechelic nitrogen-functional oligomers with more than one pendant ethylenic unsaturation may be useful as crosslinkers in polymerizations.

In the following Examples, the following abbreviations were used:

| | |
|---|---|
| AA | acrylic acid |
| APP | 1-(3-aminopropyl)-2-pyrrolidinone |
| DA | n-decyl acrylate |
| DMAPA | N,N-dimethylaminopropyl amine |
| HBA | 4-hydroxybutyl acrylate |
| HQ | hydroquinone |
| MSA | methanesulfonic acid |
| OA | n-octyl acrylate |
| BDDA | 1,4-butanediol diacrylate |

EXAMPLE 1

Preparation of Precursor Macromonomer

Precursor macromonomers were prepared by a continuous high temperature polymerization process. The polymerization reactor was a 3.05 meter (10 feet) long section of stainless steel tubing having a inner diameter of 1.6 mm ($\frac{1}{16}^{th}$ inch) and a wall thickness of 1.3 mm (0.050 inch) connected at one end to a high pressure pump (Hewlett Packard Model HP 1050 TI) and at another end to a back-pressure control device. Between the two ends, the section of tubing was coiled about a torus-shaped metal mandrel. The mandrel was situated above a primary coil of a transformer so that the coils of tubing and the mandrel functioned as secondary coils of the transformer. The coils of tubing were further equipped with one end of a temperature probe. The other end of the temperature probe was connected to a temperature controlling device. The temperature controlling device regulated the current supplied to the primary coil of the transformer which regulated the heat of inductance imparted to the coiled steel tubing.

A reaction mixture was prepared by mixing 2500 g acetone, 825 g OA, 1008 g DA, 666.7 g HBA and 50.0 g di-t-butyl peroxide Nitrogen was bubbled through the mixture while stirring.

Acetone was pumped through the tubing via the high pressure pump at a rate of from 0.05 to 10 milliliters per minute (ml/min). The pressure was maintained at a level of from 20 MPa (200 bars) to 35 MPa (350 bars). Current was supplied to the primary coil of the transformer to raise the mandrel temperature to 230° C. After about 15 minutes, the solvent being pumped through the tubing was replaced by the reaction mixture which was continuously pumped through the tubing at the same rate, temperature and pressure. After allowing the solvent to be cleared from the tubing, product was collected as the effluent from the back-pressure control device. When the addition of the reaction mixture was nearly complete, solvent was pumped through the tubing at the same rate, pressure, and temperature as the reaction mixture. Solvent and residual monomer was removed on a rotary evaporator or a wiped-film evaporator. The resulting precursor macromonomer, Example 1, was a liquid at room temperature with an average composition of 3.8OA/4.6DA/4.2HBA. Example 1 had a $M_w$ of 5600, a $M_n$ of 2200, and a polydispersity of 2.6 as measured by GPC. Approximately 70% of the precursor macromonomers contained a terminal unsaturation.

EXAMPLE 2

Preparation of Nitrogen-functional Macromonomers

Example 2.1: A mixture containing 500 g of the precursor macromonomer of Example 1 and 24.9 g of APP was first heated for 3 hours at 80° C., then heated for 10 hours at 90° C. The relative conversion was followed using proton NMR integration of the C=C—H protons with respect to the —OCH$_2$—protons of the precursor macromonomer. After heating for another 48 hours at 120° C., the integration ratio indicated that 56% of the precursor macromonomer was converted to the nitrogen-functional macromonomer. Next, another 6.2 g of APP was added to the mixture. The mixture was further heated for 24 hours at 120° C. The yield of the nitrogen-functional macromonomer was approximately 60%. The mixture was passed through a wiped film evaporator to remove unreacted amine and other impurities to yield a brown liquid.

Example 2.2: A mixture containing 350 g of the precursor macromonomer of Example 1 and 12.5 g of DMAPA was first heated for 3 hours at 800° C., then heated for 18 hours at 90° C., followed by further heating for 24 hours at 120° C. At this point, the conversion, as measured in Example 2.1, was negligible. To the mixture, 50 g of isopropanol was added and the mixture was then heated for 72 hours at 120° C. After this reaction period, 73% of the precursor macromonomer was converted to the nitrogen-functional macromonomer. A second portion of 3.1 g of DMAPA was added to the mixture and the mixture was heated for 24 hours at 120° C. The yield of the nitrogen-functional macromonomer was approximately 80%. The mixture was passed through a wiped film evaporator to remove unreacted amine and other impurities to yield a light brown liquid.

EXAMPLE 3

Preparation of Semi-Telechelic Nitrogen-Functional Oligomers

Synthesis: A reaction mixture of nitrogen-functional macromonomer, AA, HQ, and toluene was added to a 1-liter, 4 neck round bottom flask equipped with a Dean-Starke trap and condenser, a thermometer, an air sparge, an overhead blade stirrer, and a serum stopper. The reaction mixture was heated to reflux at 110° C. to 120° C. for 30 minutes to removed residual moisture. Next, the catalyst, MSA, was added to the reaction mixture and the reaction mixture was heated at reflux for a period of 5 to 8 hours. The progress of the reaction was monitored by measuring the water removed from the reaction mixture. After no further water was removed, the reaction was stopped by cooling the reaction mixture containing the semi-telechelic nitrogen-functional oligomer to room temperature.

TABLE 3.1

Reaction Mixtures and Catalyst

| Reaction Mixture | Example 3.1 | Example 3.2 |
|---|---|---|
| Nitrogen-functional macromonomer | 348 g Example 2.1 | 288 g Example 2.2 |
| AA | 91 g | 76 g |
| Toluene | 246 g | 288 g |
| HQ | 0.7 g | 0.6 g |
| Catalyst | | |
| MSA | 5.1 g | 14.4 g |

Purification: The semi-telechelic nitrogen-functional oligomer was purified by first mixing the reaction mixture with predried Amberlite IRN-78 ion exchange resin (Amberlite is a trademark of Rohm and Haas Co.) for 1 hour to remove the MSA. The ion exchange resin was removed by filtration and rinsed with toluene. Next the semi-telechelic nitrogen-functional oligomer was passed through a wiped film evaporator at 100° C. to 120° C. and 13.3 kPa (100 mm of Hg) to remove the toluene solvent. Residual AA was removed with a second pass through the wiped film evaporator at 130° C. and 0.27 kPa (2 mm of Hg).

A titration of the semi-telechelic nitrogen-functional oligomer showed partial complexation of the nitrogen-functionality with acid. The semi-telechelic nitrogen-functional oligomer was dissolved in toluene and treated with Amberlite IRN-78 ion exchange resin to removed the complexed acid. After treatment, approximately 500 ppm of HQ was added and the toluene was distilled from the semi-telechelic nitrogen-functional oligomer.

The average composition of semi-telechelic nitrogen-functional oligomers of Example 3.1 and Example 3.2 were calculated using NMR to determine the ratios of the residuals of the first monomer, second monomers, the nitrogen functionality, and GPC to determine the molecular weight. Based on Mn, the weight average molecular weight, the average composition was calculated and is reported in Table 3.2. The BDDA residue represents the HBA residue which has been esterified with pendant AA. The nitrogen functionality is reported as the starting amine.

TABLE 3.2

Average Composition of Semi-Telechelic Nitrogen-Functional Oligomers

|  | Example 3.1 | Example 3.2 |
|---|---|---|
| Average Composition | 3.1OA/3.8DA/2.2BDDA/ 0.22APA | 2.6OA/3.1DA/2.0BDDA/ 0.37DMAPA |
| $M_w$ | 7646 | 13,702 |
| $M_n$ | 1820 | 1553 |
| HQ | 468 ppm | 508 ppm |

EXAMPLE 4
Semi-Telechelic Nitrogen-Functional Oligomers as Pigment Dispersants Pigment Slurries: Pigment slurries were prepared by adding 5 g pigment and 95 g xylene to a shot mill and agitating the mixture for 20 minutes on a paint shaker. The pigment slurries were filtered through coarse paint filters and stored in sealed bottles. Pigment slurries were prepared containing the following pigments:

TABLE 4.1

Pigments and Sources

| Color | Source |
|---|---|
| Cyan | Irgalite Blue GLO (Ciba Specialty Chemicals) |
| Magenta | Irgalite Rubine L4BD (Ciba Specialty Chemicals) |
| Yellow | Irgalite Yellow BAW (Ciba Specialty Chemicals) |
| Black | Raven 450 (Columbian Chemicals Co.) |

Dispersant Solutions: Dispersant solution were prepared by dissolving 10 g of the semi-telechelic nitrogen-functional oligomer in 90 g xylene. Dispersed Pigment Samples: Pigment slurries were shaken to resuspend any settled pigment. To a small vial, 100 µl pigment slurry, 100 µl dispersant solution, and 500 µl xylene were added. The vial was capped and sonicated for 10 minutes in an ultrasonic bath. Evaluation of Dispersed Pigment Samples: One drop of the dispersed pigment sample was placed onto a microscope slide, covered with a cover slip, and allowed to sit for 2 minutes. The sample on the microscope slide was observed with a microscope at a magnification of 250×. Flocculation was readily seen as large irregularly shaped agglomerates of particles. Well dispersed samples had a uniform distribution of particles without agglomerates. Samples were rated on a scale of 1 to 5 in which 1 represents a highly agglomerated samples while 5 represents a well dispersed sample.

TABLE 4.2

Evaluations of Dispersed Pigment Samples

| Dispersant | Cyan | Magenta | Yellow | Black |
|---|---|---|---|---|
| Example 3.1 | 1 | 5 | 2 | 5 |
| Example 3.2 | 1 | 5 | 5 | 5 |
| Comparative A | 3 | 4 | 3 | 1 |

Comparative A: Ebecryl 450 (UCB Chemicals)

The results in Table 4.2 show that the semi-telechelic nitrogen-functional oligomers of this invention, as exemplified by Example 3.1 and Example 3.2, were good pigment dispersants for magenta and black pigments. Example 3.2 was also a good pigment dispersant for yellow pigments.

EXAMPLE 5
Photocure of Pigmented Radiation Curable Formulation Containing Semi-Telechelic Nitrogen-Functional Oligomer A pigmented radiation curable formulation was prepared by mixing 10.0 g Example 3.2, 3.9 g Irgalite Rubine L4BD pigment, 10.0 g trimethylolpropane triacrylate (TMPTA), and 1.0 g Irgacure 1173 photoinitiator (Irgacure is a trademark of Ciba Specialty Chemicals). A coated sample was prepared by applying a 25 µm thick film of the formulation onto a glass slide using a doctor blade. The coated sample was exposed to a dose of 1296 mJ/cm² in a Fusion Systems UV processor (Fusion UV Systems, Inc.) equipped with a H bulb. The coated sample containing the semi-telechelic nitrogen-functional oligomer of this invention cured to a solid, tack-free film, indicating that the semi-telechelic nitrogen-functional oligomer was polymerized.

We claim:

1. A semi-telechelic nitrogen-functional oligomer with formula:

$$R_1R_2N-(CH_2)_m-(NH)_n-A$$

wherein A is the residue of an macromonomer bearing at least one pendant ethylenic unsaturation;

wherein A has a degree of polymerization in the range of 2 to 50;

wherein n is 0 or 1;
   wherein m is 0 when n is 0;
   wherein m is an integer in the range of 0 to 18 when n is 1;

wherein:
   i) $R_1$ and $R_2$ are groups independently selected from the group consisting of H, $C_1$ to $C_{12}$ branched, unbranched, and cyclic alkyl; phenyl; and substituted phenyl;
   wherein only $R_1$ or $R_2$ is H; or
   ii) $R_1R_2N-$ is a cyclic group.

2. The semi-telechelic nitrogen-functional oligomer of claim 1 wherein A has the formula:

$$[Y]_y[Z]_z-H$$

wherein Y is the residue of a monomer selected from the group consisting of alkyl esters of (meth)acrylic acid, hydroxyalkyl esters of (meth)acrylic acid, (meth)acrylamide, N-substituted (meth)acrylamides, methyl vinyl ketone, and mixtures thereof;

wherein Z is the residue of a monomer bearing a pendant ethylenic unsaturation;

wherein y is 1 to 49;

wherein z is 1 to 49;

wherein the sum of y and z is 2 to 50.

3. The semi-telechelic nitrogen-functional oligomer of claim 1 wherein A has the formula:

$$CH_2-CH(X)-CH_2-[Y]_y[Z]_z-H$$

wherein Y has the formula: $CH_2=CR_3R_4$;

wherein $R_3$ is H or $CH_3$;

wherein $R_4$ is selected from the group consisting of $-COOR_5$, $-CONH_2$, $-CONHR_5$, and $-COCH_3$;

wherein $R_5$ is a $C_1$ to $C_{12}$ branched, unbranched, or cyclic alkyl group;

wherein Z has the formula: $CH_2=CR_3R_6$;

wherein $R_6$ is selected from the group consisting of $-COOR_7$, $-CONHR_7$, and $-CONR_5R_7$;

wherein $R_7$ contains a pendant ethylenic unsaturation;

wherein X is $R_4$ or $R_6$;

wherein y is 1 to 49;
wherein z is 1 to 49;
wherein the sum of y and z is 2 to 50.

4. The semi-telechelic nitrogen-functional oligomer of claim 1 wherein A has the formula:

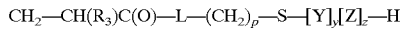

wherein L is a linker group selected from the group consisting of ester, urethane, amide, amine, and ether linkages;

wherein $R_3$ is H or $CH_3$;

wherein Y is the residue of a monomer selected from the group consisting of olefins, styrenes, substituted styrenes, vinyl esters, vinyl ethers, alkyl esters of (meth)acrylic acid, hydroxyalkyl esters of (meth)acrylic acid, (meth)acrylamide, N-substituted (meth)acrylamides, and methyl vinyl ketone;

wherein Z is the residue of a monomer bearing a pendant ethylenic unsaturation;

wherein y is 1 to 49;
wherein z is 1 to 49;
wherein the sum of y and z is 2 to 50; and
wherein p is 1 to 20.

5. A method of preparing a semi-telechelic nitrogen-functional oligomer with formula:

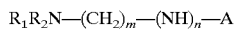

wherein A is the residue of an macromonomer bearing at least one pendant ethylenic unsaturation;

wherein A has a degree of polymerization in the range of 2 to 50;

wherein n is 0 or 1;
wherein m is 0 when n is 0;
wherein m is an integer in the range of 0 to 18 when n is 1;

wherein:
i) $R_1$ and $R_2$ are groups independently selected from the group consisting of H, $C_1$ to $C_{12}$ branched, unbranched, and cyclic alkyl; phenyl; and substituted phenyl;

wherein only $R_1$ or $R_2$ is H; or ii) $R_1R_2N$— is a cyclic group;

comprising the steps of:

a) preparing a terminally unsaturated precursor macromonomer bearing pendant functional groups;

b) reacting an amine with terminal unsaturation of said terminally unsaturated precursor macromonomer; and c) reacting modifiers comprising ethylenic unsaturation with said pendant functional groups.

6. The method of claim 5 wherein said terminally unsaturated precursor macromonomer is prepared by polymerization at a temperature in the range of 150° C. to 500° C.

7. The method of claim 6 wherein said polymerization is a continuous process.

* * * * *